(12) United States Patent
Liu et al.

(10) Patent No.: US 12,177,112 B2
(45) Date of Patent: Dec. 24, 2024

(54) DEVICE VIRTUALIZATION METHOD, APPARATUS, SYSTEM, DEVICE, AND STORAGE MEDIUM

(71) Applicant: ZTE Corporation, Shenzhen (CN)

(72) Inventors: Ning Liu, Shenzhen (CN); Zhixiang Cai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 384 days.

(21) Appl. No.: 17/622,767

(22) PCT Filed: Oct. 28, 2020

(86) PCT No.: PCT/CN2020/124267
§ 371 (c)(1),
(2) Date: Dec. 24, 2021

(87) PCT Pub. No.: WO2021/083172
PCT Pub. Date: May 6, 2021

(65) Prior Publication Data
US 2022/0247671 A1 Aug. 4, 2022

(30) Foreign Application Priority Data
Oct. 30, 2019 (CN) .......................... 201911047856.3

(51) Int. Cl.
*H04L 45/24* (2022.01)
*H04L 12/46* (2006.01)
(Continued)

(52) U.S. Cl.
CPC ............ *H04L 45/245* (2013.01); *H04L 45/76* (2022.05); *H04L 47/41* (2013.01)

(58) Field of Classification Search
CPC ........ H04L 45/245; H04L 45/76; H04L 47/41
See application file for complete search history.

(56) References Cited

U.S. PATENT DOCUMENTS 8,724,517 B1 * 5/2014 Bulusu .................... H04L 45/00
370/254
10,700,890 B1 * 6/2020 Kalyanaraman ........ H04L 41/12
(Continued)

FOREIGN PATENT DOCUMENTS

CN 103200071 A 7/2013
CN 105610743 A 5/2016
(Continued)

OTHER PUBLICATIONS

International Searching Authority. International Search Report and Written Opinion for PCT Application No. PCT/CN2020/124267 and English translation, mailed Jan. 27, 2021, pp. 1-10.
(Continued)

*Primary Examiner* — Xuan Lu
(74) *Attorney, Agent, or Firm* — Vivacqua Crane, PLLC

(57) ABSTRACT

A device virtualization method, apparatus and system, a device and a non-transitory computer-readable storage medium are disclosed. The device virtualization method may include: determining virtual information of a virtual device based on device information of a local device and device information of a peer device, the local device and the peer device are a plurality of first devices in a Multichassis Link Aggregation Group (MC-LAG), the device information comprises a bridge ID and a port ID, and the virtual information comprises a virtual bridge ID and a target port ID; switching an extended protocol message with the peer device; and determining a role and state of the port of the local device based on the virtual information and the extended protocol message of the peer device in combination with a protocol message received by the local device.

14 Claims, 4 Drawing Sheets

(51) Int. Cl.
*H04L 41/0806* (2022.01)
*H04L 41/0893* (2022.01)
*H04L 41/0895* (2022.01)
*H04L 45/48* (2022.01)
*H04L 45/76* (2022.01)
*H04L 47/41* (2022.01)
*H04L 49/253* (2022.01)

(56) References Cited

U.S. PATENT DOCUMENTS

| | | | | |
|---|---|---|---|---|
| 2014/0036924 | A1* | 2/2014 | Christenson | H04L 12/4641 370/395.53 |
| 2014/0247754 | A1* | 9/2014 | Venkata | H04L 45/48 370/256 |
| 2014/0254604 | A1* | 9/2014 | Janardhanan | H04L 45/18 370/401 |
| 2014/0307540 | A1 | 10/2014 | Duda et al. | |
| 2015/0256405 | A1* | 9/2015 | Janardhanan | H04L 12/4675 370/255 |
| 2015/0288620 | A1* | 10/2015 | Yasuda | H04L 49/552 370/401 |
| 2016/0301608 | A1* | 10/2016 | Natarajan | H04L 12/2865 |
| 2017/0257309 | A1 | 9/2017 | Appanna | |
| 2018/0198888 | A1* | 7/2018 | King | H04L 41/0806 |
| 2018/0302315 | A1* | 10/2018 | Kamisetty | H04L 12/462 |
| 2018/0331855 | A1 | 11/2018 | Subramanian et al. | |

FOREIGN PATENT DOCUMENTS

| | | |
|---|---|---|
| CN | 107154864 A | 9/2017 |
| CN | 108173757 A | 6/2018 |

OTHER PUBLICATIONS

Intellectual Property India. Examination Report for IN Application No. 202127060765 and English translation, mailed Dec. 12, 2022, pp. 1-6.

The State Intellectual Property Office of People's Republic of China. First Office Action for CN Application No. 201911047856.3 and English translation, mailed Nov. 23, 2022, pp. 1-12.

The State Intellectual Property Office of People's Republic of China. First Search Report for CN Application No. 2019110478563 and English translation, mailed Nov. 10, 2022, pp. 1-3.

European Patent Office. Extended European Search Report for EP Application No. 20881373.3, mailed Aug. 4, 2022, pp. 1-11.

\* cited by examiner

DEVICE VIRTUALIZATION METHOD, APPARATUS, SYSTEM, DEVICE, AND STORAGE MEDIUM

CROSS-REFERENCE TO RELATED APPLICATION

This application is a national stage filing under 35 U.S.C. § 371 of international application number PCT/CN2020/124267, filed Oct. 28, 2020, which claims priority to Chinese patent application No. 201911047856.3, filed Oct. 30, 2019. The contents of these applications are incorporated herein by reference in their entirety.

TECHNICAL FIELD

The present application relates to local area networks (LAN) and, for example, to a device virtualization method, apparatus and system, a device and a storage medium.

BACKGROUND

Multichassis Link Aggregation Group (MC-LAG) technology enhances the reliability of links and devices by enabling a plurality of devices to negotiate link aggregation in the same state with a device connected thereto as if the connected device establishes a link aggregation relation with one device. In a Local Area Network (LAN), Spanning Tree Protocol (STP) can improve the reliability of the network and avoid loops caused by redundant links. The loops also need to be avoided in the MC-LAG. However, as the STP is a distributed technology, a plurality of devices perform calculation independently, which is inconsistent with the principle that two devices are virtualized into one device logically by the MC-LAG technology. Calculation results of a spanning tree may block links or some member ports in the MC-LAG, resulting in a failure of MC-LAG functions and poor system stability.

SUMMARY

According to the present application, a device virtualization method, apparatus, system, a device and a storage medium are provided.

According to an embodiment of the present application, a device virtualization method is provided, including:
  determining virtual information of a virtual device based on device information of a local device and device information of a peer device in a Multichassis Link Aggregation Group (MC-LAG), where the local device and the peer device are a plurality of first devices in the MC-LAG, the device information includes a bridge ID and a port ID, and the virtual information includes a virtual bridge ID and a target port ID;
  switching an extended protocol message with the peer device; and
  determining roles and states of ports of the local device based on the virtual information and the extended protocol message of the peer device in combination with a protocol message received by the local device.

According to an embodiment of the present application, a device virtualization apparatus is further provided, including:
  a virtualization module configured to determine virtual information of a virtual device based on device information of a local device and device information of a peer device in a Multichassis Link Aggregation Group (MC-LAG), where the local device and the peer device are a plurality of first devices in the MC-LAG, the device information includes a bridge ID and a port ID, and the virtual information includes a virtual bridge ID and a target port ID;
  a message switching module configured to switch an extended protocol message with the peer device; and
  a port calculation module configured to determine a role and state of ports of the local device based on the virtual information and the extended protocol message of the peer device in combination with a protocol message received by the local device.

According to an embodiment of the present application, a device virtualization system is further provided, including: a plurality of first devices in a Multichassis Link Aggregation Group (MC-LAG) and a second device communicating with the first devices;
  the device virtualization apparatus is integrated in each of the first devices; and
  the second device is configured to send a Spanning Tree Protocol (STP) message to the first devices.

According to an embodiment of the present application, a device is further provided, including:
  one or more processors; and
  a storage device configured to store one or more programs;
  where the one or more programs, when executed by the one or more processors, cause the one or more processors to perform the device virtualization method.

According to an embodiment of the present application, a non-transitory computer-readable storage medium storing a computer program is further provided, where the computer program, when executed by a processor, causes the processor to perform the device virtualization method.

DETAILED DESCRIPTION

The present application will be described below with reference to the accompanying drawings by embodiments. The embodiments described herein are merely used for explaining the present application. The embodiments of the present application and the features in the embodiments may be randomly combined with each other in the case of no conflict.

Figure 1:
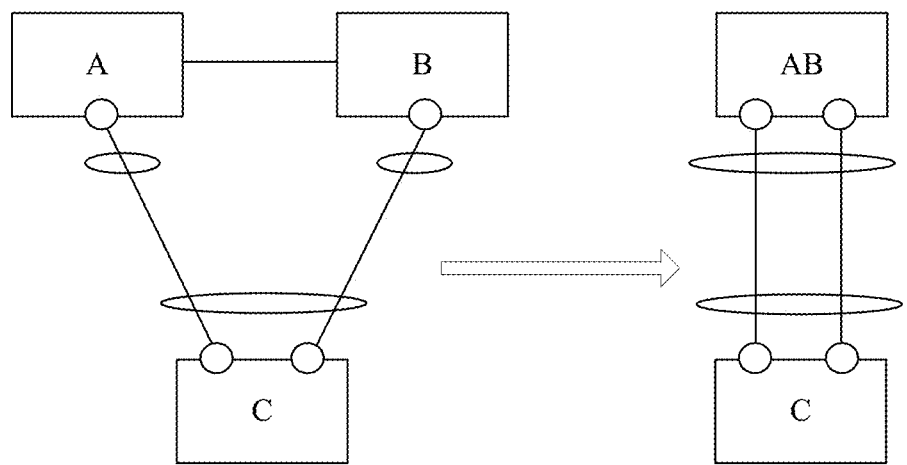
FIG. 1 is a schematic diagram of a Multichassis Link Aggregation Group (MC-LAG) according to an embodiment.

MC-LAG is a Multichassis Link Aggregation Group technology applied to dual regression access scenarios, and the basic idea thereof is to enable two access devices to negotiate link aggregation in the same state with a device connected thereto as if the connected device establishes a link aggregation relation with one device. FIG. 1 is a schematic diagram of the MC-LAG according to an embodiment. As shown in FIG. 1, the MC-LAG may be understood as a Horizontal Virtual Switching Technology (H-VST) in which two devices (A and B) in the MC-LAG are logically virtualized into one device to form a unified second-level logical node which may communicate with a device C at the same time.

Figure 2:
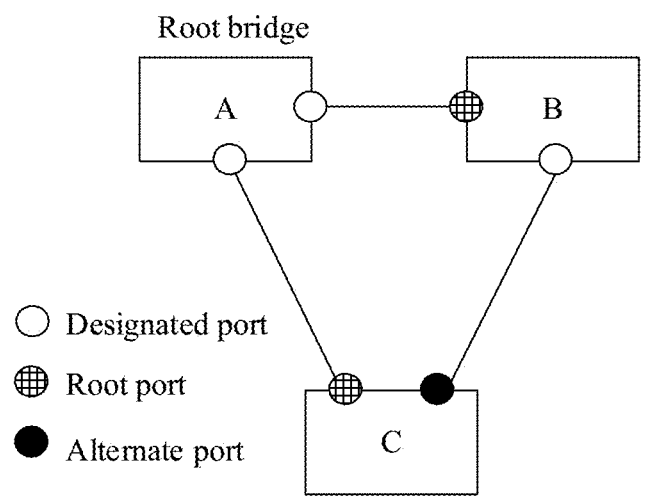
FIG. 2 is a schematic diagram of Spanning Tree Protocol (STP) networking according to an embodiment.

Spanning Tree Protocol (STP) is a distributed algorithm technology, and the basic principle thereof is to select a simple loop-free and fully connected active topology from any Local Area Networks (LAN) having physical topology, namely, a spanning tree. The STP can solve the problem of loop risks caused by redundant links in the LAN. FIG. 2 is a schematic diagram of STP networking according to an embodiment. As shown in FIG. 2, the spanning tree is provided with a unique root called a root bridge, with other bridges each having a unique root port which is a port having a path to reach the root bridge at the lowest cost. Each bridge may be provided with several designated ports responsible for forwarding data frames of the LAN connected thereto. One LAN may only be connected to one designated port, and one bridge (except the root bridge) only has one root port connected to another LAN, and other ports such as a non-root port and a designated port on the bridge will be blocked. This spanning tree connects all LANs together, and is also loop-free because of a tree structure thereof, thus solving loop problems in the networks.

There will be some problems in case of adopting a conventional STP to guard against loop risks in the MC-LAG. As the STP is a distributed technology, a plurality of devices perform calculation independently, and peer-links between the devices in the MC-LAG and member ports of the MC-LAG are added in calculation respectively, which is inconsistent with the principle of logically virtualizing two devices into one device by the MC-LAG technology, and calculation results of the spanning tree may block peer-link ports and some ports of the devices in the MC-LAG, resulting in a failure of MC-LAG functions and poor system stability.

In the embodiment of the present application, in view of the problems that the MC-LAG cannot be effectively merged with STP to solve loop risks and poor system stability, a device virtualization method is provided. According to this method, by virtualizing two first devices into the same state, switching extended protocol messages thereof and determining roles and states of ports by a spanning tree mechanism, loops are avoided, the effectiveness of MC-LAG functions is ensured, and the robustness and fault-tolerant capability of the system are improved.

Figure 3:
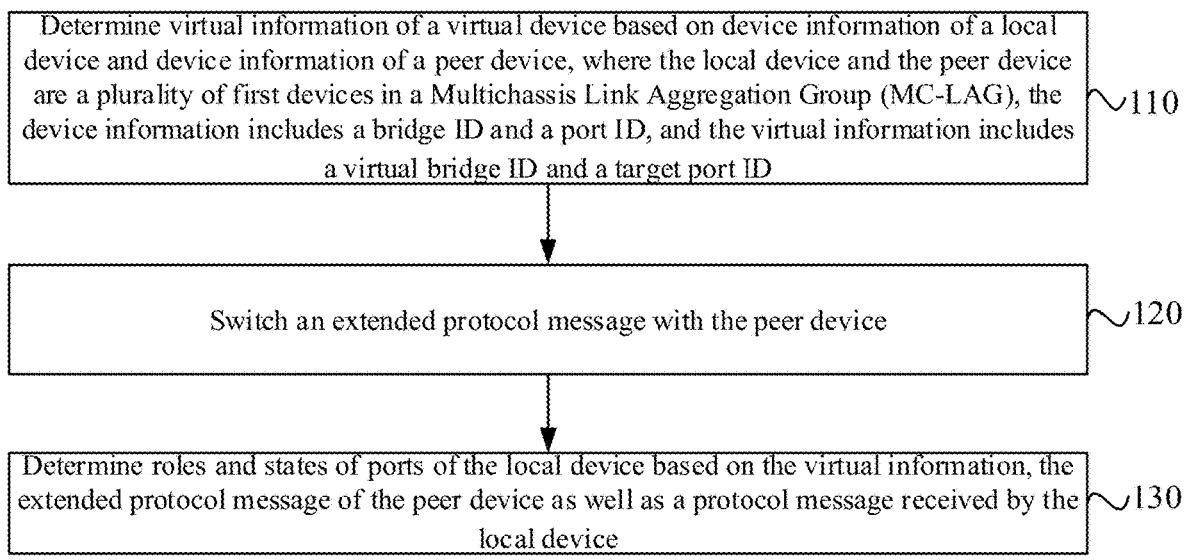
FIG. 3 is a flow chart of a device virtualization method according to an embodiment.

FIG. 3 is a flow chart of a device virtualization method according to an embodiment. As shown in FIG. 3, the method in this embodiment includes following steps of S110, S120 and S130.

At S110, virtual information of a virtual device is determined based on device information of a local device and device information of a peer device. The local device and the peer device are a plurality of first devices in a Multichassis Link Aggregation Group (MC-LAG), the device information includes a bridge ID and a port ID, and the virtual information includes a virtual bridge ID and a target port ID.

In this embodiment, the first devices are devices in the MC-LAG, e.g., there are two devices in the MC-LAG, namely devices A and B which simultaneously implement the device virtualization method in this embodiment to virtualize the devices A and B into one virtual device to enable the devices A and B to have the same state. A second device is a device which may communicate with the virtual device (i.e., with the devices A and B at the same time). In an embodiment, there may be one or more second devices, which may also be virtual devices formed by at least two devices through MC-LAG (communication between the first devices and the second devices may be communication between virtual devices in two MC-LAGs). In following embodiments, the device A is taken as an example for description, where the device A is a local device and the device B is a peer device.

At S110, the local device and the peer device synchronize corresponding bridge ID(s) and port ID(s) thereof, negotiate with each other to obtain a virtual bridge ID for STP processing, and enable ports in the same MC-LAG adopt the same port ID, i.e., the target port ID. For example, a master device and a slave device may be determined between the local device and the peer device based on a default rule, and the bridge ID and the port IDs corresponding to the master device may serve as the virtual bridge ID and the target port IDs, respectively, so as to solve the port ID conflict between the two devices. For example, one of the local device and the peer device with a smaller bridge ID may be determined as the master device, or the smaller bridge ID of the local device and the peer device may be directly selected as the virtual bridge ID, and the port IDs in the MC-LAG corresponding to the device with the smaller bridge ID may be directly selected as the target port IDs, etc.

At S120, an extended protocol message, which is generated based on a Spanning Tree Protocol (STP) message received by the local device, is switched with the peer device.

In this embodiment, the local device switches the extended protocol message with the peer device. The extended protocol message is generated based on the STP message sent from the second device by adding information of a message receiving port receiving the STP message to the STP message. For example, upon receipt of a STP message from a device C, the local device A performs protocol processing on the STP message locally, sends the STP message added with the information of the message receiving port to the peer device B, and also receives an extended protocol message from the peer device B. The extended protocol message includes the information of the message receiving port of the peer device B receiving the STP message.

At S130, roles and states of ports of the local device are determined based on the virtual information, the extended protocol message of the peer device as well as the STP message received by the local device.

In this embodiment, the local device converts the extended protocol message of the peer device into a message received by a local port for processing. In this process, the local port is a port corresponding to the information of the message receiving port in the extended protocol message of the peer device. when there is no such local port, the extended protocol message is converted or processed based on the type of the extended protocol message or based on whether the message receiving port is a root port, and the role and state of at least one local port may be calculated by a protocol state machine based on the STP message received by the local device, where the roles include the root port, a designated port and a non-designated port (an alternate port and a backup port), and the states include disable, blocking, listening, learning and forwarding.

In this embodiment, the local device and the peer device in the MC-LAG determine the roles and states of the ports by synchronizing the bridge IDs and the port IDs with each other, switching the extended protocol message generated based on the STP message, and converting the extended protocol message into the message received by the local port for protocol processing, thus virtualizing the two devices into one device for STP calculation. The ports of the two devices in the MC-LAG have the same calculation result and send the same message, and each first device may send the same STP message to the second device connected to the same MC-LAG, thus achieving link aggregation, avoiding loop risks and improving system stability.

Figure 4:
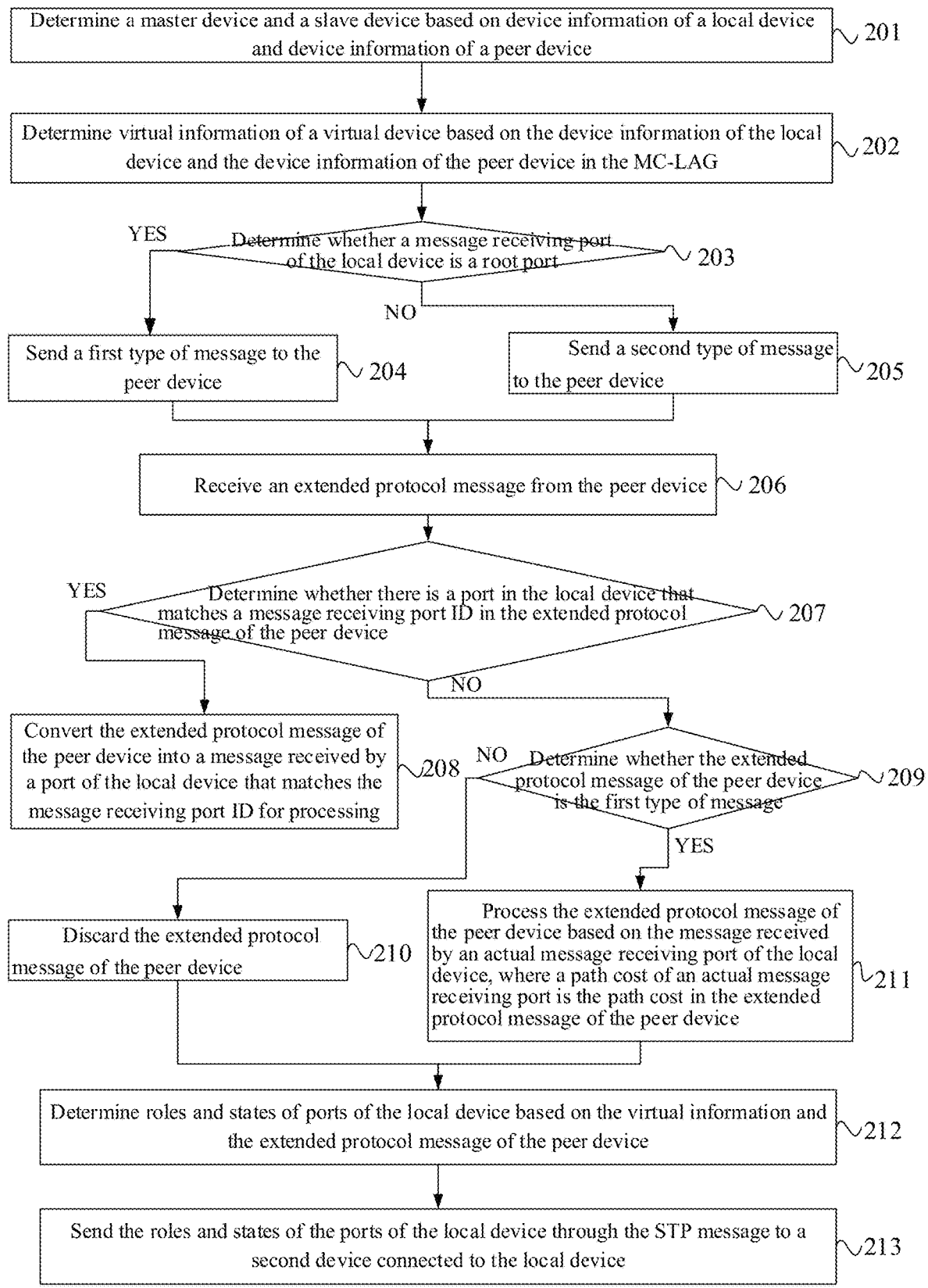
FIG. 4 is a flow chart of another device virtualization method according to an embodiment.

FIG. 4 is a flow chart of another device virtualization method according to an embodiment. As shown in FIG. 4, the method in this embodiment includes following steps of S201, S202, S203, S204, S205, S206, S207, S208, S209, S210, S211, S212 and S213.

At S201, a master device and a slave device are determined based on the device information of the local device and the device information of the peer device.

For example, the local device and the peer device synchronize the bridge IDs and the port IDs with each other, and one of the local device and the peer device is selected as the master device through comparison, e.g., the device with a smaller bridge ID is taken as the master device while the other one is taken as the slave device.

At S202, the virtual information of the virtual device is determined based on the device information of the local device and the device information of the peer device in the MC-LAG.

In an embodiment, the step in which the virtual information of the virtual device is determined based on the device information of the local device and the device information of the peer device in the MC-LAG includes following steps of: taking a bridge ID of the master device as the virtual bridge ID; and in case of inconsistent port IDs of ports of the master device and the slave device in the MC-LAG, taking port IDs of ports of the master device in the MC-LAG as the target port IDs.

For example, the bridge ID of the master device serves as the virtual bridge ID for subsequent running of the STP. The port IDs of the ports of a device in the network are assigned by the device (the local device). In case of assigning different port IDs to the ports of the master device and the slave device in the same MC-LAG, the ports of the slave device in the same MC-LAG may adopt the port IDs of the corresponding ports of the master device in the MC-LAG to solve the port conflict.

In an embodiment, the step in which the target port IDs of the virtual device are determined based on the device information of the local device and the device information of the peer device in the MC-LAG includes: taking the port IDs assigned to the ports of one device as the target port IDs in a case where the port IDs have been assigned to the ports of one of the local device and the peer device.

For example, the port IDs are not assigned to the local device, but to the peer device in the MC-LAG. In this case, the port IDs may be assigned to the local device according to the port IDs of the corresponding ports of the peer device in the MC-LAG.

At S203, whether a message receiving port of the local device is a root port is determined. If yes, the S204 is performed; otherwise, the S205 is performed.

At S204, a first type of messages is sent to the peer device.

At S205, a second type of messages is sent to the peer device.

In an embodiment, an extended protocol message includes the first type of messages and the second type of messages.

In this embodiment, based on whether the message receiving port of the local device is the root port, different types of extended protocol messages are sent to the peer device. The local device receives an STP message sent from a second device, and after the message is processed and calculated by a protocol state machine, the role of at least one local port may be preliminarily calculated. When the message receiving port is the root port, it sends the first type of messages to the peer device to indicate that the message receiving port of the local device is the root port; otherwise, it sends the second type of messages to the peer device to indicate that the message receiving port of the local device is a non-root port. Information of the message receiving port is added to the STP message to generate the extended protocol message.

In an embodiment, the information of the message receiving port includes port IDs and a path cost.

The extended protocol message includes a message receiving port ID and a path cost of the corresponding device.

At S206, the extended protocol message of the peer device is received.

At S207, whether there is a port in the local device that matches the message receiving port ID in the extended protocol message of the peer device is determined. When there is a port in the local device that matches the message receiving port ID in the extended protocol message of the peer device, the S208 is performed; otherwise, the S209 is performed.

In this embodiment, whether there is a port in the local device that matches the message receiving port ID in the extended protocol message of the peer device is searched, and the extended protocol message of the peer device is converted or processed based on a search result.

At S208, the extended protocol message of the peer device is converted into a message received by a port of the local device that matches the message receiving port ID for processing.

At S209, whether the extended protocol message of the peer device belongs to the first type of messages is determined. If yes, the S211 is performed; otherwise, the S210 is performed.

At S210, the extended protocol message of the peer device is discarded.

At S211, the extended protocol message of the peer device is processed based on the message received by an actual message receiving port of the local device, where a path cost of the actual message receiving port is the path cost in the extended protocol message of the peer device.

In this embodiment, when there is a port in the local device that matches the message receiving port ID in the extended protocol message of the peer device (the port ID is the same as the message receiving port ID), the extended protocol message of the peer device is converted into the message received by the port for processing, and the path cost adopted for processing is the path cost of the port. When there is no such port, and the extended protocol message of the peer device belongs to the first type of messages (sent by the root port), the extended protocol message of the peer device is processed based on the message received by the actual message receiving port of the local device. During processing, the path cost of the actual message receiving port is replaced by the path cost carried in the extended protocol message of the peer device for calculation. When there is no such port, and the extended protocol message of the peer device belongs to the second type of messages (sent by the non-root port), the extended protocol message is discarded.

At S212, the roles and states of the ports of the local device are determined based on the virtual information, the extended protocol message of the peer device as well as the STP message received by the local device.

At S213, the roles and states of the ports of the local device are sent through the STP message to the second device connected to the local device.

In this embodiment, the two devices in the MC-LAG may calculate the same device state by synchronizing the device information, switching the extended protocol messages and performing STP calculation by the protocol state machine respectively, and ports in the same MC-LAG will calculate the role and state of the same port, so that the ports of the two devices in the same MC-LAG will send the same protocol message when sending a message externally. The devices may externally show a state of one virtual device when receiving the message from the second device, thus enabling the function of virtualizing the two devices into one virtual device and avoiding loop risks.

Figure 5:
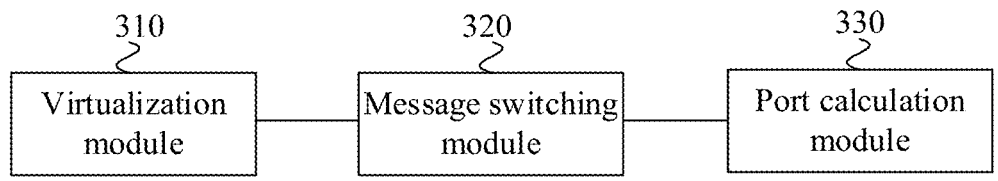
FIG. 5 is a schematic structural diagram of a device virtualization apparatus according to an embodiment.

According to an embodiment of the present application, a device virtualization apparatus is further provided. FIG. 5 is a schematic structural diagram of the device virtualization apparatus according to the embodiment. As shown in FIG. 5, the device virtualization apparatus includes a virtualization module 310, a message switching module 320 and a port calculation module 330. The device virtualization apparatus may be integrated in devices supporting MC-LAG technology, such as switches, bridges or routers.

The virtualization module 310 is configured to determine virtual information of a virtual device based on device information of a local device and device information of a peer device in a Multichassis Link Aggregation Group (MC-LAG). The local device and the peer device are a plurality of first devices in the MC-LAG, the device information includes a bridge ID and port IDs, and the virtual information includes a virtual bridge ID and target port IDs.

The message switching module 320 is configured to switch an extended protocol message with the peer device.

The port calculation module 330 is configured to determine roles and states of ports of the local device based on the virtual information, the extended protocol message of the peer device as well as a protocol message received by the local device.

The device virtualization apparatus in this embodiment virtualizes the two first devices into the same state in the MC-LAG, switches the extended protocol messages, and determines the roles and states of the ports by a spanning tree mechanism, thus avoiding loops, ensuring the effectiveness of MC-LAG functions and improving system stability.

In an embodiment, the apparatus further includes a master-slave determination module.

The master-slave determination module is configured to determine a master device and a slave device based on the device information of the local device and the device information of the peer device.

In an embodiment, the virtualization module 310 is configured to: take a bridge ID of the master device as the virtual bridge ID, and in case of inconsistent port IDs of the ports of the master device and the slave device in the MC-LAG, take the port IDs of the ports of the master device in the MC-LAG as the target port IDs.

In an embodiment, the virtualization module 310 is further configured to: take the port IDs assigned to the ports of one device as the target port IDs in a case where the port IDs have been assigned to the ports of one of the local device and the peer device.

In an embodiment, the extended protocol message includes a first type of message and a second type of message.

The message switching module 320 is configured to: send the first type of message to the peer device when a message receiving port of the local device is a root port, and send the second type of message to the peer device when the message receiving port of the local device is a non-root port; and receive the extended protocol message of the peer device.

In an embodiment, the extended protocol message includes a message receiving port ID and a path cost.

In an embodiment, the apparatus further includes a searching module, a first conversion module and a second conversion module.

The searching module is configured to search whether there is a port in the local device that matches the message receiving port ID in the extended protocol message of the peer device.

The first conversion module is configured to, when there is a port in the local device that matches the message receiving port ID in the extended protocol message of the peer device, convert the extended protocol message of the peer device into a message received by the port of the local device that matches the message receiving port ID for processing.

The second conversion module is configured to, when there is no port in the local device that matches the message receiving port ID in the extended protocol message of the peer device, process the extended protocol message received by the local device based on the type of the extended protocol message of the peer device.

In an embodiment, the second conversion module is configured to: convert the extended protocol message of the peer device into the message received by an actual message receiving port of the local device for processing when the extended protocol message of the peer device belongs to the first type of messages, where a path cost of the actual message receiving port is the path cost in the extended protocol message of the peer device; and discard the extended protocol message of the peer device when the extended protocol message of the peer device belongs to the second type of messages.

In an embodiment, the apparatus is further configured to: send the roles and states of the ports of the local device to a second device connected thereto through a Spanning Tree Protocol (STP) message, where the roles include the root port, a designated port and a non-designated port, and the states include disable, blocking, listening, learning and forwarding.

The extended protocol message is generated based on the STP message received by the local device.

Any technical details of the device virtualization apparatus proposed in this embodiment that are not described in this embodiment may be found in any of the above embodiments, and this embodiment has the same effect as that by implementing the device virtualization method.

Figure 6:
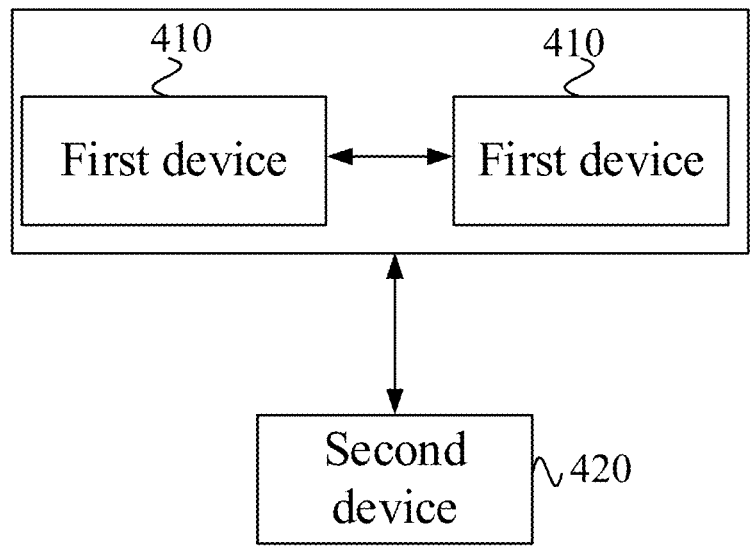
FIG. 6 is a schematic structural diagram of a device virtualization system according to an embodiment.

According to an embodiment of the present application, a device virtualization system is further provided. FIG. 6 is a schematic structural diagram of the device virtualization system in this embodiment. As shown in FIG. 6, the device virtualization system includes first devices 410 in a Multichassis Link Aggregation Group (MC-LAG) and a second device 420 communicating with the first devices 410, and there are at least two first devices 410. The above device virtualization apparatus described in any of the above embodiment is integrated in each first device 410. The second device 420 is configured to send a Spanning Tree Protocol (STP) message to each first device 410.

In this embodiment, at least two first devices 410 implement the device virtualization method in any of the above embodiments synchronously in the MC-LAG, and determine roles and states of ports by synchronizing bridge IDs and port IDs with each other, switching extended protocol messages, converting the received extended protocol message into a message received by a local port, and calculating and processing the message by a protocol state machine. The ports in the MC-LAG have the same calculation result and send the same message, and send the same STP message to the second device 420 connected thereto in the same MC-LAG. In this embodiment, the function of virtualizing the two devices into one virtual device is enabled to avoid loop risks and improve system stability.

Any technical details of the device virtualization system proposed in this embodiment that are not described in this embodiment may be found in any of the above embodiments, and this embodiment has the same effect as that by implementing the device virtualization method.

According to an embodiment of the present application, a device is further provided. The device virtualization method may be implemented by the device virtualization apparatus which may be implemented by software and/or hardware and integrated in the device. The device is a node in a spanning tree structure, such as a switch.

Figure 7:
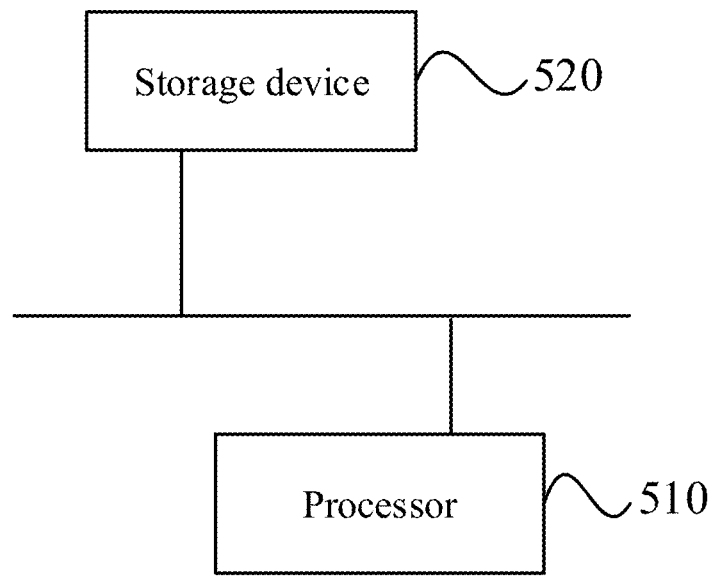
FIG. 7 is a schematic structural diagram of a device according to an embodiment.

FIG. 7 is a schematic structural diagram of a device according to an embodiment. As shown in FIG. 7, the device in this embodiment includes a processor 510 and a storage device 520. There may be one or more processors 510 in the device, and FIG. 7 shows an example of one processor 510. The processor 510 and the storage device 520 in the device may be connected by a bus or in other ways, and FIG. 7 shows an example of bus connection.

The one or more programs, when executed by the one or more processors 510, cause the one or more processors 510 to carry out the device virtualization method described in any of the above embodiments.

As a non-transitory computer-readable storage medium, the storage device 520 in the device may be configured to store one or more programs, which may be software programs, computer-executable programs and modules, such as program instructions/modules corresponding to the device virtualization method in the embodiment of the present application (for example, the modules in the device virtualization device shown in FIG. 5, including the virtualization module 310, the message switching module 320 and the port calculation module 330). The processor 510 executes various function applications and data processing of the device by running software programs, instructions and modules stored in the storage device 520, i.e., implementing the device virtualization method in the above embodiments.

The storage device 520 includes a storage program region and a storage data region, where the storage program region may store an operating system and at least one application program required for the function, and the storage data region may store data created in the use of the device (such as the device information and the extended protocol messages in the above embodiments). In addition, the storage device 520 may include a high-speed random access memory and a nonvolatile memory, such as at least one magnetic-disk memory, a flash memory, or other nonvolatile solid-state memory. In some examples, the storage device 520 may include memories remotely located with respect to the processor 510, and these remote memories may be connected to the device through a network. Examples of the above network include an Internet, intranet, LAN, mobile communications network and a combination thereof.

Furthermore, in a case where one or more programs included in the above device are executed by the one or more processors 510, following steps are realized, such as determining virtual information of a virtual device based on device information of a local device and device information of a peer device in a Multichassis Link Aggregation Group (MC-LAG), where the device information includes a bridge ID and port IDs, and the virtual information includes a virtual bridge ID and target port IDs; switching an extended protocol message with the peer device, where the extended protocol message is generated based on a Spanning Tree Protocol (STP) message received by the local device; and determining roles and states of ports of the local device based on the virtual information, the extended protocol message of the peer device as well as the STP message received by the local device.

Any technical details of the device proposed in this embodiment that are not described in this embodiment may be found in any of the above embodiments, and this embodiment has the same effect as that by implementing the device virtualization method.

According to an embodiment of the present application, a non-transitory computer-readable storage medium storing a computer-executable instruction is further provided, where the computer-executable instruction, when executed by a computer processor, causes the computer processor to carry out the above device virtualization method.

From the above description of the embodiments, the present application may be implemented by software and general hardware, or by hardware. The technical schemes of the present application may be embodied in the form of software products, which may be stored in computer-readable storage media, such as floppy disk, Read-Only Memory (ROM), Random Access Memory (RAM), FLASH, hard disk or optical disk of a computer, and include a plurality of instructions to enable a computer device (which may be a personal computer, a server, or a network device) to implement the method described in the embodiments of the present application.

Those described above are merely embodiments of the present application, and are not intended to limit the scope of protection of the present application.

Any block diagrams of logic flows in the accompanying drawings of the present application may represent procedure steps, or interconnected logic circuits, modules and functions, or a combination of the procedure steps and the logic circuits, modules and functions. The computer program can be stored in the memory. The memory may be of all types suitable for the local technology and may be implemented by all proper data storage technologies, such as ROM, RAM, optical storage devices and systems (Digital Video Disc (DVD) or Compact Disk (CD)). The computer-readable medium may include a non-transient storage medium. A data processor may be all types suitable for the local technology, such as a general-purpose computer, a special-purpose computer, microprocessor, a Digital Signal Processor (DSP), an Application Specific Integrated Circuit (ASIC), a Field-Programmable Gate Array (FPGA) and a processor based on multi-core processor architecture.

What is claimed is:

1. A device virtualization method, comprising:
    determining virtual information of a virtual device based on device information of a local device and device information of a peer device, wherein the local device and the peer device are a plurality of first devices in a Multichassis Link Aggregation Group (MC-LAG), the device information comprises a bridge ID and a port ID, and the virtual information comprises a virtual bridge ID and a target port ID;

switching an extended protocol message with the peer device; and determining a role and state of the port of the local device based on the virtual information and the extended protocol message of the peer device in combination with a protocol message received by the local device.

2. The method of claim 1, further comprising:
determining a master device and a slave device based on the device information of the local device and the device information of the peer device.

3. The method of claim 2, wherein determining virtual information of a virtual device based on device information of a local device and device information of a peer device comprises:
taking a bridge ID of the master device as the virtual bridge ID; and
in response to the port ID of the port of the master device being inconsistent with that of the slave device in the MC-LAG, taking the port ID of the port of the master device in the MC-LAG as the target port ID.

4. The method of claim 1, wherein determining virtual information of a virtual device based on device information of a local device and device information of a peer device comprises:
in response to the port ID having been assigned to the port of one of the local device and the peer device, taking the port ID assigned to the port of one device as the target port ID.

5. The method of claim 1, wherein the extended protocol message comprises a first type of message and a second type of message;
switching an extended protocol message with the peer device comprises:
sending the first type of message to the peer device in response to a message receiving port of the local device being a root port, and sending the second type of message to the peer device in response to the message receiving port of the local device being a non-root port; and
receiving the extended protocol message from the peer device.

6. The method of claim 1, wherein the extended protocol message comprises a message receiving port ID and a path cost.

7. The method of claim 6, prior to determining a role and state of the port of the local device based on the virtual information and the extended protocol message of the peer device in combination with a protocol message received by the local device, further comprising:
searching whether there is a port in the local device that matches the message receiving port ID in the extended protocol message of the peer device;
in response to there being a port in the local device that matches the message receiving port ID in the extended protocol message of the peer device, converting the extended protocol message of the peer device into a message received by the port of the local device that matches the message receiving port ID for processing; and
in response to there being no port in the local device that matches the message receiving port ID in the extended protocol message of the peer device, processing the extended protocol message received by the local device based on the type of the extended protocol message of the peer device.

8. The method of claim 7, wherein processing the extended protocol message received by the local device based on the type of the extended protocol message of the peer device comprises:
converting the extended protocol message of the peer device into a message received by an actual message receiving port of the local device for processing in response to the extended protocol message of the peer device being a first type of message, wherein a path cost of the actual message receiving port is the path cost in the extended protocol message of the peer device; and
discarding the extended protocol message of the peer device in response to the extended protocol message of the peer device being a second type of message.

9. The method of claim 1, further comprising:
sending the role and state of the port of the local device to a second device connected the local device through a Spanning Tree Protocol (STP) message, wherein the role comprise a root port, a designated port and a non-designated port, and the state comprise disable, blocking, listening, learning and forwarding.

10. The method of claim 1, wherein the extended protocol message is generated based on the STP message received by the local device.

11. A device, comprising:
one or more processors;
a storage device configured to store one or more programs; and
the one or more programs, when executed by the one or more processors, cause the one or more processors to perform the device virtualization method of claim 1.

12. A non-transitory computer-readable storage medium storing a computer program, wherein the computer program, when executed by a processor, causes the processor to perform the device virtualization method of claim 1.

13. A device virtualization apparatus, comprising:
a virtualization module configured to determine virtual information of a virtual device based on device information of a local device and device information of a peer device, wherein the local device and the peer device are a plurality of first devices in a Multichassis Link Aggregation Group (MC-LAG), the device information comprises a bridge ID and a port ID, and the virtual information comprises a virtual bridge ID and a target port ID;
a message switching module configured to switch an extended protocol message with the peer device; and
a port calculation module configured to determine a role and state of the port of the local device based on the virtual information and the extended protocol message of the peer device in combination with a protocol message received by the local device.

14. A device virtualization system, comprising: a plurality of first devices in a Multichassis Link Aggregation Group (MC-LAG) and a second device communicating with the first devices;
the device virtualization apparatus of claim 13 is integrated in each first device; and
the second device is configured to send a Spanning Tree Protocol (STP) message to the plurality of first devices.

* * * * *